US010148139B2

(12) United States Patent
Lauk et al.

(10) Patent No.: US 10,148,139 B2
(45) Date of Patent: Dec. 4, 2018

(54) ELECTRICAL MACHINE FOR ADJUSTING MOVING PARTS IN A MOTOR VEHICLE BY MOTOR, AND ALSO METHOD FOR PRODUCING THE ELECTRICAL MACHINE

(71) Applicant: Robert Bosch GmbH, Stuttgart (DE)

(72) Inventors: Detlef Lauk, Renchen (DE); Gerald Roos, Achern (DE); Peter Kusserow, Buehl (DE); Tarek Mili, Lauterbourg (FR)

(73) Assignee: Robert Bosch GmbH, Stuttgart (DE)

( * ) Notice: Subject to any disclaimer, the term of this patent is extended or adjusted under 35 U.S.C. 154(b) by 901 days.

(21) Appl. No.: 14/425,278

(22) PCT Filed: Aug. 15, 2013

(86) PCT No.: PCT/EP2013/067068
§ 371 (c)(1),
(2) Date: Mar. 2, 2015

(87) PCT Pub. No.: WO2014/032982
PCT Pub. Date: Mar. 6, 2014

(65) Prior Publication Data
US 2015/0236552 A1    Aug. 20, 2015

(30) Foreign Application Priority Data

Aug. 28, 2012 (DE) .................... 20 2012 012 484 U
Sep. 4, 2012 (DE) .................... 20 2012 012 483 U
Feb. 1, 2013 (DE) ........................ 10 2013 201 715

(51) Int. Cl.
*H02K 1/17* (2006.01)
*H02K 1/24* (2006.01)
(Continued)

(52) U.S. Cl.
CPC .................. *H02K 1/17* (2013.01); *H02K 1/24* (2013.01); *H02K 5/143* (2013.01); *H02K 15/03* (2013.01);
(Continued)

(58) Field of Classification Search
CPC ............ H02K 1/17; H02K 1/18; H02K 15/03; H02K 2213/035
(Continued)

(56) References Cited

U.S. PATENT DOCUMENTS 3,510,707 A * 5/1970 Latta ........................ H02K 5/04
310/112
4,296,343 A * 10/1981 McMillen ................ H02K 1/17
310/154.48
(Continued)

FOREIGN PATENT DOCUMENTS

DE          1071214       12/1959
DE        102009033623     1/2010
(Continued)

OTHER PUBLICATIONS

International Search Report for Application No. PCT/EP2013/067068 dated Aug. 29, 2014 (English Translation, 3 pages).

*Primary Examiner* — Bernard Rojas
*Assistant Examiner* — Maged Almawri
(74) *Attorney, Agent, or Firm* — Michael Best & Friedrich LLP (57) ABSTRACT

Electrical machine (10), and also method for producing an electrical machine, in particular for adjusting moving parts in a motor vehicle by motor, having a stator (12) into which a rotor (14) can be inserted, wherein the stator (12) has two permanent magnets (18) which are situated opposite one another and which are arranged in a pole housing (16) which forms a magnetic return path, and the pole housing (16) has (Continued)

flattened regions (20) between the two permanent magnets (18), the pole housing wall (26) forming two magnetic follower poles (22), which are situated opposite one another, on the said flattened regions, wherein the maximum dimension (25) of the pole housing (16) between the two flattened regions (20) which are situated opposite one another—axially in the region of the follower poles (22)—forms a width (24) across flats for the installation space of the electrical machine (10) which is equal to a maximum of 35 mm—and in particular a maximum of 30 mm.

25 Claims, 5 Drawing Sheets (51) Int. Cl.
 *H02K 5/14* (2006.01)
 *H02K 15/03* (2006.01)
(52) U.S. Cl.
 CPC ..... *H02K 2213/03* (2013.01); *Y10T 29/49012* (2015.01); *Y10T 29/53143* (2015.01)
(58) Field of Classification Search
 USPC ............ 310/154.21, 154.29, 154.01, 154.22, 310/154.03, 154.08, 154.12, 154.13, 89, 310/40 MM
 See application file for complete search history.

(56) References Cited

U.S. PATENT DOCUMENTS

| | | | |
|---|---|---|---|
| 4,372,035 A | 2/1983 | McMillen | |
| 4,626,723 A * | 12/1986 | McMillen | H02K 16/00 310/112 |
| 4,893,043 A * | 1/1990 | Baines | H01R 39/50 310/239 |
| 5,066,878 A * | 11/1991 | Sekine | B60S 1/08 310/40 MM |
| 5,105,113 A * | 4/1992 | Ishikura | H02K 23/04 310/154.29 |
| 5,412,267 A * | 5/1995 | Okada | H02K 1/17 29/596 |
| 5,434,460 A * | 7/1995 | Mabuchi | H02K 5/145 310/40 MM |
| 5,473,210 A * | 12/1995 | Someya | H02K 1/17 29/607 |
| 6,104,109 A * | 8/2000 | Sato | H02K 15/14 310/154.08 |
| 6,316,850 B1 * | 11/2001 | Nakamura | H02K 23/405 310/261.1 |
| 6,515,389 B1 * | 2/2003 | Hartz | H02K 23/04 310/154.08 |
| 6,700,269 B2 * | 3/2004 | Torii | H02K 15/14 310/152 |
| 7,528,515 B2 * | 5/2009 | Kuroda | H02K 1/17 310/154.01 |
| 7,683,513 B2 * | 3/2010 | Huck | H02K 1/17 310/154.09 |
| 8,040,005 B2 * | 10/2011 | Bhatti | H02K 1/17 310/154.09 |
| 2004/0061406 A1 * | 4/2004 | Yokota | H02K 1/17 310/216.004 |
| 2006/0071567 A1 * | 4/2006 | Acosta | H02K 5/02 310/154.08 |
| 2007/0007838 A1 * | 1/2007 | Kuroda | H02K 23/04 310/154.21 |
| 2007/0057588 A1 * | 3/2007 | Hyodo | H02K 1/17 310/154.07 |
| 2008/0079321 A1 * | 4/2008 | Fleytman | H02K 1/17 310/43 |
| 2009/0200881 A1 * | 8/2009 | Bhatti | H02K 1/17 310/89 |
| 2010/0231072 A1 * | 9/2010 | Qin | H02K 23/04 310/83 |
| 2011/0018380 A1 * | 1/2011 | Yoshida | H02K 5/148 310/154.21 |
| 2012/0043840 A1 * | 2/2012 | Annaka | H02K 1/17 310/83 |
| 2012/0194023 A1 * | 8/2012 | Lau | H02K 23/04 310/154.01 |
| 2015/0349617 A1 * | 12/2015 | Roos | H02K 23/04 318/400.32 |

FOREIGN PATENT DOCUMENTS

| | | |
|---|---|---|
| EP | 1154541 | 11/2001 |
| EP | 2131473 | 12/2009 |

* cited by examiner

ELECTRICAL MACHINE FOR ADJUSTING MOVING PARTS IN A MOTOR VEHICLE BY MOTOR, AND ALSO METHOD FOR PRODUCING THE ELECTRICAL MACHINE

BACKGROUND OF THE INVENTION

The invention is based on an electric machine and a method for producing the electric machine.

U.S. Pat. No. 4,372,035 discloses an electric motor in which two opposite permanent magnets are arranged in a pole housing with two so-called consequent poles between said permanent magnets. In order to form the consequent poles, a contour is formed in the pole housing wall, the arcuate inner surface of said contour having the same spacing from the rotor as the shell-shaped permanent magnets. A person skilled in the art is given no indication here of optimizing the weight and the power density of the electric motor with respect to an installation space available for specific application cases.

SUMMARY OF THE INVENTION

The electric machine according to the invention and the method according to the invention for producing such an electric machine have the advantage over the prior art that the weight and the power density for adjustment drives in a motor vehicle can be optimized by the formation of a maximum width across flats of the pole housing between the sides with the two opposite consequent poles.

In particular in applications with a small available installation space, such as, for example, sliding roof drives, seat adjustment device, tailgate adjustment device, window winder drives and (rear) wiper motors, a universal adjustment drive for various applications which produces the maximum power density with optimum utilization of installation space can be made available by designing the pole housing for a maximum width across flats of 35 mm or, depending on the required torque, of at most 30 mm. Owing to the selection of the design, the exciting forces which cause disruptive operational noises are effectively reduced at the same time with an optimum magnetic flux.

Owing to the measures mentioned in the dependent claims, advantageous developments and improvements of the features specified in the independent claims are possible. It is of particular advantage to design the thickness of the pole housing wall, in particular in the region of the consequent poles, to be approximately 2%-7% of the width across flats, preferably approximately 3%-4%. Given this ratio of the wall thickness to the width across flats, the optimum is between the formation of a maximum magnetic flux for the drive of the rotor and a minimum weight of the pole housing with at the same time minimization of the inducement of noises owing to vibrations of the pole housing.

It is particularly favorable if the radial thickness of the permanent magnets is in the range of 10%-25% of the width across flats, preferably approximately 15%-18%. Given this design of the magnetic circuit, with a minimum weight and a minimum use of expensive magnet material, a maximum power density in the available installation space can be achieved. In this case, for example, ferrite material can be used for the magnets, with the result that it is possible to dispense with the use of rare earth magnet materials.

Owing to the matching of the design of the rotor to the width across flats, the magnetic circuit can be optimized further by virtue of the rotor teeth having a tangential tooth shaft width in the region of the windings of approximately 3%-10%, preferably approximately 5%-7% of the width across flats. This ratio represents a good balance between maximum magnetic flux and weight reduction. Even with this design, a reduction in the amount of disruptive vibrations induced by the magnetic system is achieved. It has proven to be particularly advantageous to use ten rotor teeth in the case of 4 magnet poles (2 permanent magnets and 2 consequent poles).

In order to reduce a fluctuation in torque caused by the cogging of the rotor, but at the same time to keep the magnetic flux between the permanent magnets and the rotor as high as possible, the inner contour of the permanent magnets is formed with different radii. In this case, a central region has an inner radius which is at most 15% greater than the rotor radius in order to keep the air gap as small as possible here. A larger inner radius is formed at the two adjacent regions of the permanent magnets, and this results in the torque ripple being reduced. Owing to the formation of two discrete different inner radii, a higher magnetic flux is maintained in contrast to continuous pole lifting.

In this case, it is advantageous to form the central region over a circumferential angle of 50°-60°, in particular approximately 54°. In this case, the two outer regions have an angular range of approximately 15°-25°.

The consequent poles are implemented particularly favorably by in each case two beads running in the axial direction being integrally formed in the pole housing wall. A curved inner contour is thus formed in the circumferential direction, and this inner contour interacts magnetically with the rotor. The pole housing is advantageously in the form of a pole pot, which has a base formed integrally with the pole pot on one side, which base preferably has a receptacle for a rotor bearing. The opposite open pole pot side has a flange, which bears against a corresponding opposing flange of a further housing part after assembly.

A transition region is formed in an axial region between the flange and the beads of the consequent pole, in which transition region the cross section of the pole housing makes a transition from the consequent pole contour with the beads to the cross section of the flange, which preferably has two approximately parallel sides. This transition region is preferably formed by means of deep drawing and has, for example, an axial length of 4 mm-13 mm.

Directly adjacent to the flange, a connecting region is formed on the pole housing, which connecting region has a larger maximum dimension between the flattened housing sides than the width across flats. This connecting region preferably has the same inner contour as the flange with two parallel inner sides. This connecting region can advantageously receive a brushholder component part, which extends axially via the interface of the flange into the adjacent housing part. For example, holes in the form of receptacles for connecting elements, preferably screws or rivets, to a gearbox are formed on the flange.

In order to fix the permanent magnets in the pole housing in a particularly simple manner, said permanent magnets are pressed against the inner wall by means of spring elements. In this case, the free ends of the U-shaped springs bear against side faces of the permanent magnets which point in circumferential direction. For this purpose, a cavity or gap is formed between the beads of the consequent pole contour and the side faces of the magnets, in which cavity or gap the free ends of the spring engage. The spring in this case bears firstly against the side face of the magnet in circumferential direction and, on the opposite side, against the inner face of the bead, for defined positioning.

In order that the spring element does not tip in the axial direction when the limbs bear against the inner edges of the beads, the free ends do not engage completely in the gap as far as the inner wall of the pole housing, but at most up to half the radial depth of the gap. The spring element can optionally also be used in combination with adhesive bonding of the permanent magnets in place in order to fix said permanent magnets in a reliable manner during the adhesive-bonding process.

In order to additionally position the spring elements, stops are formed on the pole base, which stops prevent a radial movement of the spring bow inwards. These stops can be integrally formed on the pole base without an additional process step as rim holes during deep-drawing of the pole base.

The interface according to the invention between the housing flanges with the connecting region and the transition region of the pole housing is suitable in particular for a modular design of gear/drive units having different electric motors, which are combined with different gearboxes. In this case, a brushholder component part with an identical basic body can always be used, which brushholder component part is arranged axially between the two housing parts, axially beyond the flange region. In particular, the gearbox can receive different electronics, for example withdrawable-part electronics or an integrated printed circuit board or only a reduced sensor system. Likewise, a gearbox without electronics can be combined, in which only the brushholder component part has directly a connection plug. For the electric motors, both the pole housing according to the invention with the consequent poles and a 2-pole or 4-pole permanent magnet pole pot can be used. Considerable savings can be made on development costs owing to the modular design and different applications can be produced in a timely manner without reorganizing production lines.

Owing to the production method for the pole housing according to the invention, the consequent pole region, the transition region and the connecting region with the flange are formed in an expensive and precise manner by means of deep drawing in one working step. In this case, the design according to the invention of the specific dimensions of specific components in relation to the maximum width across flats can be realized with minimum usage of materials owing to the selection of the deep-drawing die. For example, the radial stops for the bow springs can also at the same time be integrally formed such that the magnets can be fixed in a reliable manner in the pole housing without any additional complexity being involved.

The axial mounting of the rotor and the brushholder component part in the pole housing enables a uniquely presettable flange interface, which is particularly favorably suited to a modular system for combining various pole housings and gearboxes.

BRIEF DESCRIPTION OF THE DRAWINGS

Embodiments of the invention are illustrated in the drawings and explained in more detail in the description below.

DETAILED DESCRIPTION

Figure 1:
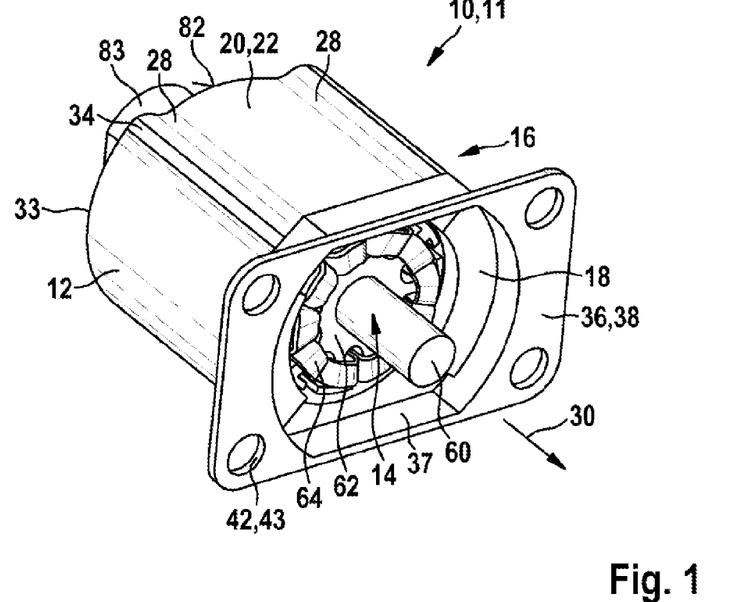
FIG. 1 shows a first exemplary embodiment of an electric machine according to the invention

FIG. 1 shows an electric machine 10 according to the invention in the form of an electric motor 11. The electric motor 11 is part of a gear/drive unit 130, for example, as is used for adjusting a sliding roof, a window pane or a seat part in a motor vehicle. The electric machine 10 has a stator 12, in which two permanent magnets 18 are arranged opposite one another in a pole housing 16. Two mutually opposite consequent poles 22 are arranged between the two mutually opposite permanent magnets 18, said consequent poles 22 being formed by the housing wall 26 of the pole housing 16. For this purpose, in each case two beads 28 are formed in flattened regions 20 of the pole housing 16, said beads extending in the axial direction 30. The consequent pole 22 is in the form of a curved pole housing wall 26 in the circumferential direction 32 between the two beads 28, said pole housing wall 26 forming, together with the beads 28 and a holding region 34 for the permanent magnets 18, the flattened region 20 of the pole housing 16. The pole housing 16 has an axially open side 36, on which a flange 38 for connection to a further housing part 40 is formed. The flange 38 has receptacles 42 for connecting elements, which are in the form of bores 43, for example. Preferably, screws, as connecting elements 142, can be screwed through these bores 43 into a corresponding opposing flange 44. A rotor 14, which forms a small radial air gap 46 with respect to the permanent magnets 18 and consequent poles 22 surrounding the rotor 14, is inserted into the stator 12 in FIG. 1.

Figure 2:
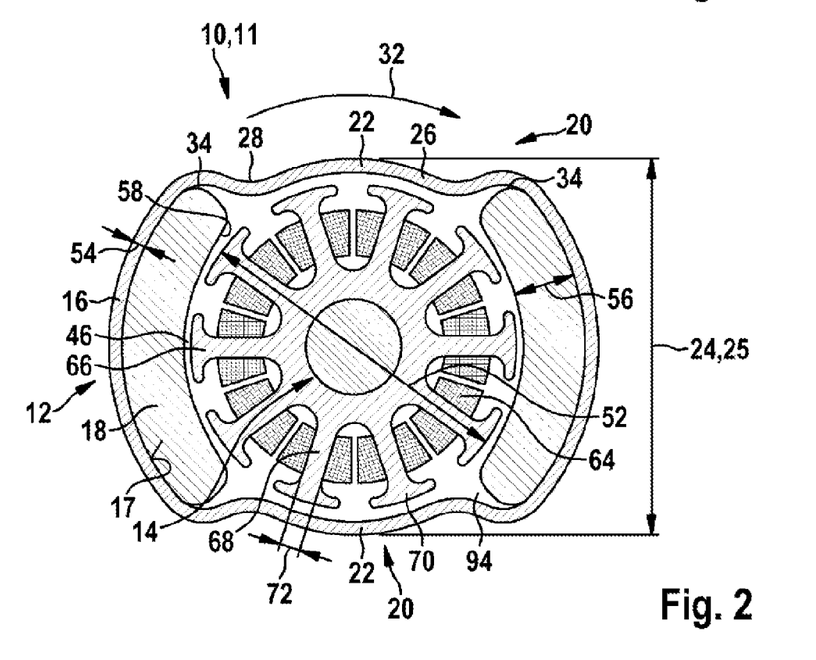
FIG. 2 shows a cross section from FIG. 1

FIG. 2 shows a section transversely to the axial direction 30 through the stator 12 and the rotor 14 in FIG. 1. The permanent magnets 18 bear against the inner wall 17 of the pole housing 16 and are adhesively bonded therein, for example, and/or fixed by means of magnetic holding springs 90 in the pole housing 16. The two permanent magnets 18 are magnetized in opposition in the radial direction 31, with the result that said two permanent magnets form a south pole, for example on their radial inner side. A magnetic circuit to the consequent poles 22 is produced via the pole housing 16, which forms a magnetic return path, and said consequent poles then form in each case a north pole on the inner wall 17 of the pole housing 16, for example. Since no permanent magnets 18 are arranged in the region of the consequent poles 22, the maximum dimension 25 of the pole housing 16 between the flattened regions 20 is much smaller than in the direction of the two permanent magnets 18. The maximum dimension 25 represents a width across flats 24 for the installation space available, which, in accordance with the invention, is matched optimally to the corresponding application, in particular to the installation position in the motor vehicle. In accordance with the invention, this width across flats 24 is always smaller than 35 mm, in which case the rotor diameter 52 is at most 32 mm, for example. Given a lower power requirement of the electric machine 10 and/or given the use of rare earth magnet material for the permanent magnets 18, the width across flats 24 can also be at most only 30 mm, in which case the rotor diameter 52 is at most 28 mm. The width across flats 24 is defined as the maximum radial dimension 25 of the pole housing 16 between the flattened regions 20, axially in the region of the consequent poles 22. In FIG. 2, the maximum radial dimension 25 is formed on the curved regions of the consequent poles 22 in the circumferential direction 32 between the beads 28. In an embodiment which is not illustrated, the maximum radial dimension 25 can also be formed on the holding region 34 of the permanent magnets 18. The wall thickness 54 of the pole housing 16 is optimized with respect to the weight, the magnetic flux and noise minimization and is 3% to 4% of the width across flats 24. Depending on the specific application for different powers, the wall thickness 54 can also be between 2% and 7%, for example between 0.8 mm and 1.8 mm. This dimension for the wall thickness 54 relates to the angular range of the consequent poles 22 and the permanent magnets 18. Since the pole housing 16 is produced as a deep-drawn part, the wall thickness 54 is relatively constant over the entire circumference, however. The radial wall thickness 56 of the permanent magnets 18 is 15% to 18% of the width across flats 24 owing to the optimization in accordance with the invention, but in particular cases may also be 10% to 25% of the width across flats 24. The permanent magnets 18 have a so-called pole lifting 58, so that the air gap 46 between the rotor 14 and the permanent magnet 18 widens in the circumferential direction 32. The rotor 14 has a rotor shaft 60, on which an armature stack 62 for receiving electrical windings 64 is arranged. For this purpose, the armature stack 64 has rotor teeth 66, which are formed from radial tooth shafts 68, which are terminated by radially outer tooth tips 70. The electrical windings 64 are wound radially within the tooth tips 70 onto the tooth shafts 68. The tooth shaft width 72 in the circumferential direction 32 is 5% to 7% of the width across flats 24 on the electrical winding 64 in the case of the optimization in accordance with the invention, depending on the power requirement and the adjustment application also 3% to 10% of the width across flats 24.

Figure 3:
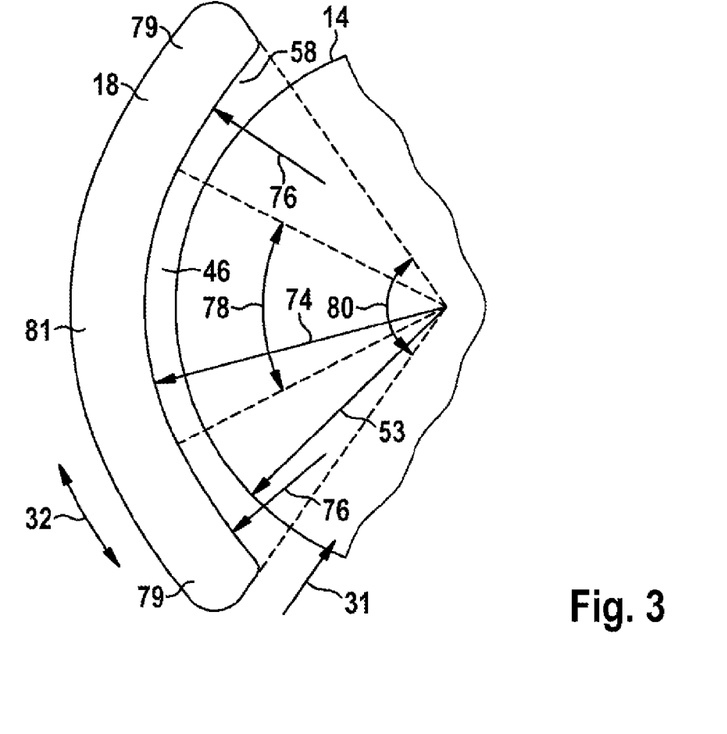
FIG. 3 shows a diagram of a detail of a further exemplary embodiment

FIG. 3 illustrates, as one variant of the invention, an enlarged detail shown in FIG. 2, in which the shell-shaped permanent magnet 18 has a first inner radius 74, which is at most 15% greater than the rotor radius 52. The first inner radius 74 extends over an angular range 78 in the circumferential direction 32 of 50° to 60° and is arranged in the center 81 of the permanent magnet 18 with respect to its circumferential direction 32. The inner contour of the permanent magnet 18 has a second inner radius 76, which is greater than the first inner radius 74, at the two outer regions 79 with respect to the circumferential direction 32. In this specific embodiment of the pole lifting 58 by means of a double radius, the very thin air gap 46 widens very considerably in a central region 81 at the outer rims 79 of the permanent magnet 18, with the result that the torque ripple can be markedly reduced without the magnetic flux decreasing excessively. The permanent magnet 18 extends with its maximum extent in the circumferential direction 32 over a total magnet angle 80 which is greater than 90°. The geometry of the opposite permanent magnet 18 is correspondingly symmetrical.

Figure 4:
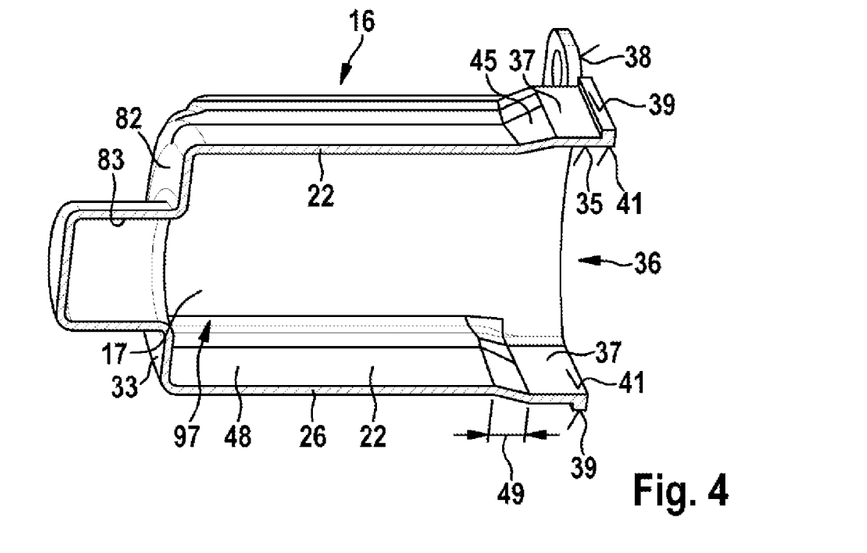
FIG. 4 shows a longitudinal section through a pole housing of a further exemplary embodiment

FIG. 4 shows a longitudinal section of the pole housing 16 along the rotor axis. Opposite the open end 36, the pole housing 16 has a closed side 33 with a closed base 82, which, in this exemplary embodiment, is formed integrally with the circumferential pole housing wall 48. A bearing receptacle 83 for a rotor bearing 84, in which the rotor 14 is mounted radially and optionally also axially, is integrally formed on the base 82. The open end 36 terminates axially with the flange 38, which has two approximately straight parallel outer sides 39 with respect to the circumference on the flattened regions 20. A connecting region 37 axially adjoins the flange 38, with the brushholder component part 86 being received in said connecting region. The connecting region 37 has precisely parallel inner faces 35 with an inner width 137 in the exemplary embodiment, which inner faces are aligned with the inner contour 41 of the flange 38 into which the brushholder component part 86 is inserted. The flange 38 with the connecting region 37 is a standardized interface 120 to a housing part 40 to be connected, which housing part 40 is in the form of a gearbox 101, for example. A transition region 45, whose maximum dimension 49 is between 4 mm and 13 mm, is formed between the axial extent of the consequent poles 22 with the axial beads 28 and the connecting region 37. Along the axial course of the transition region 45, the contour of the pole housing 16 changes from the axial beads 28 with the inner edges 97 of the consequent pole 22 with the outer maximum width across flats 24 towards the two parallel inner faces 35 of the connecting region 37 with the inner width 137. Therefore, the transition region 45 is conical, in which the inner diameter of the pole housing 16 widens. The radial wall thickness 54 of the pole housing 16 which in this case has approximately the same thickness over the entire pole housing 16 can also clearly be seen from the sectional diagram. The pole housing 16 is produced in a deep-drawing method, in particular in such a way that the axial beads 28 are also shaped during deep drawing. Therefore, the pole housing 16 has no recess in the axial direction 30.

Figure 5:
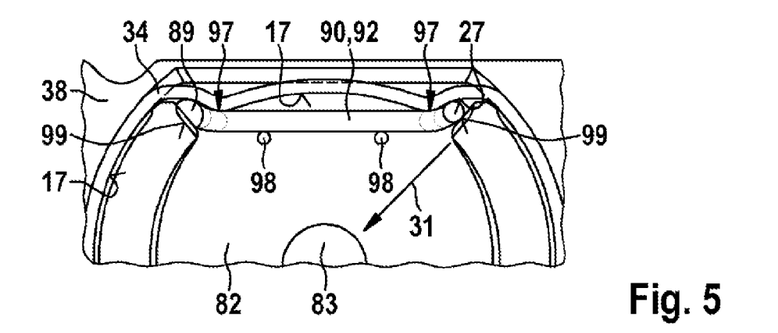
FIGS. 5 to 7 show various detail illustrations of a magnet-fastening spring according to the invention
Figure 6:
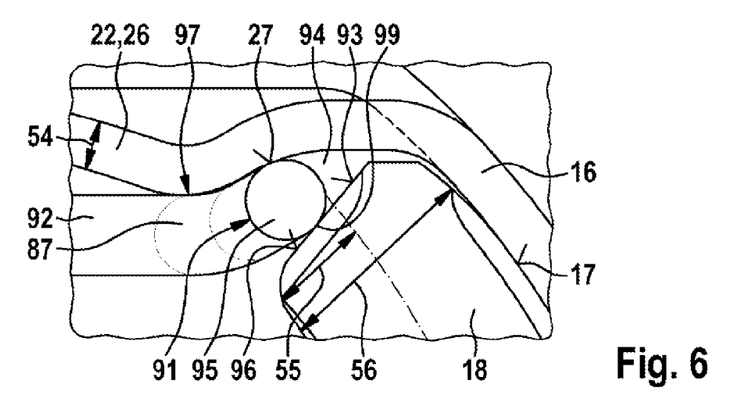
Figure 7:
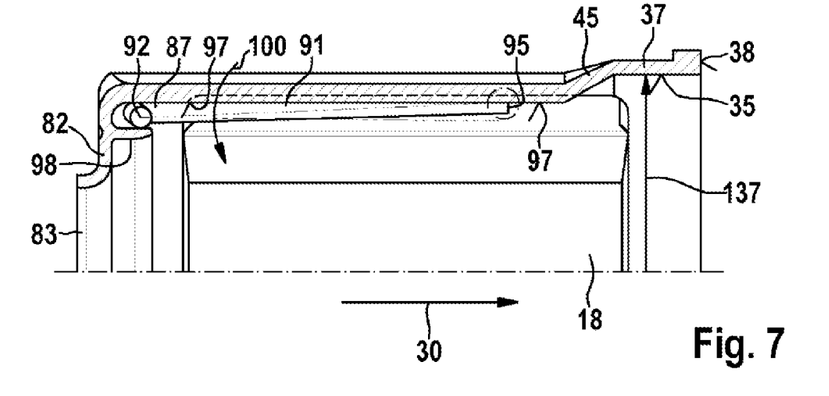

FIG. 5 shows a plan view of the open side 36 of the stator 12, in which the permanent magnets 18 are held in the pole housing 16 by means of magnetic holding springs 90. The magnetic holding spring 90 has two opposite free limbs 91, which are connected to one another via a bow 92. The free limbs 91 bear against the opposite permanent magnets 18 and press said permanent magnets against the inner wall 17 of the pole housing 16 in order to fix said permanent magnets. A cavity 94 is formed between an end side 93 of the outer region 79 which points in the circumferential direction 32 and an opposite side face 27 of the bead 28, with the limb 91 protruding into said cavity. In this case, the free end 95 of the limb 91 preferably bears both against the end side 93 and against the side face 27 of the bead 28, as can be seen in the enlarged detail in FIG. 6. In this case, in particular the cavity 94 is wedge-shaped in the radial direction 31. The stop face 99 of the limbs 91 in this exemplary embodiment bears against a radial inner region 96 of the end side 93, preferably within the radially inner half 55 of the radial wall thickness 56 of the permanent magnets 18. The cross section of the limbs 91 is round, for example, but can also be flattened (half-round 89) (as illustrated on the left in FIG. 5) or can be in the form of a flat profile or polygonal profile and/or also have a structured surface, which adheres better to the end side 93. Likewise, a structure, for example a notch in the axial direction 30, can be formed on the end side 93, with the limb 91 engaging in said structure. The two adjacent beads 28 each form inner edges 97, against which the magnetic holding spring 90 bears. In order that the bow 92, which connects the two limbs 91 beyond the inner edges 97, does not slide radially inwards, axial protrusions are formed on the base 82 of the pole housing 16 as stops 98, with the bow 92 bearing radially against the radial outer side of said stops. As result, the magnetic holding spring 90 is fixed radially between the stops 98 and the inner edges 97, wherein preferably the transition sections 87 between the limbs 91 and the bow 92 bear against the inner edges 97. The bearing point of the magnetic holding spring 90 on the inner edge 97 forms a tipping point for the magnetic holding spring 90, as is shown schematically in FIG. 7 by the arrow 100. As result, tipping of the magnetic holding spring 90 out of the axial direction 30 is minimized. In addition or as an alternative, such relatively pronounced axial tipping can also be prevented by a corresponding configuration of the cavity 94. Owing to the wedge shape of the slit-shaped cavity 94, the free ends 95 engage radially in the cavity 94 as far as possible only slightly deeper than the radial position of the inner edges 97. If the cavity 94, as described, is wedge-shaped, so that the free end 95 bears against the side face 27 and the end side 93, the deeper radial penetration of the free end 95 is prevented by the specific configuration of the cavity geometry. In this case, the limb 91 bears against the end side 93 radially as far inwards as possible. The contour of the end side 93 can in this case be matched correspondingly, for example can form wholly or partially an angle with respect to the radial direction 31. Furthermore, the outer or inner magnet edge of the outer region 79 of the permanent magnet 18 can be correspondingly beveled. The radial stop 98 is formed in one part with the base 82, for example, preferably as a rim hole during deep drawing. In this case, a single stop or two stops or more stops 98 can be formed integrally for each bow 92. In a further variant, the bow 92 bears axially against the inner wall of the base 82, which then forms an axial stop for the magnetic holding spring 90. Two magnetic holding springs 90 are clamped in between the two permanent magnets 18 and lie approximately in one plane with the flattened regions 20 of the pole housing 16. It can be seen from FIG. 7 that in this case the permanent magnets 18 extend axially beyond the consequent poles 22 into the transition region 45, in particular axially as far as the connecting region 37.

In the production method of the electric machine 10, therefore, the pole housing 16 is manufactured as a pole pot with the flange 36 and the connecting region 37 as defined interface 120 by means of deep drawing, wherein the beads 28 and the stops 98 are formed integrally in one working step. Then, the permanent magnets 18 are inserted into the pole housing 16, wherein said permanent magnets are optionally adhesively bonded to the inner wall 17 of said pole housing. In order to fix the permanent magnets 18, two magnetic holding springs 90 are introduced into the pole housing 16 in such a way that the limbs 91 bear against the end sides 93 of the permanent magnets 18 and press said end sides against the inner wall 17 of the pole housing 16. In the process, the bow 92 is positioned radially outside the stops 98 on the base 82, with the result that the bow 92 is fixed, in particular radially, between the stops 98 and the inner edge 97 of the beads 28. Once the permanent magnets 18 have been fixed, the rotor 14 and the brushholder component part 86 are introduced axially into the pole housing 16, with the result that the brushholder component part 86 is arranged in the connecting region 37 and protrudes axially beyond the flange 38. Then, a further housing part 40, which is in the form of a gearbox 101, is positioned axially, via the rotor shaft 60, on the brushholder component part 86 until the flange 38 bears against the opposing flange 44 of the housing part 40. Then, connecting elements 142, preferably screws, are introduced into the receptacles 42 of the flange 38 and connected to the housing part 40. This mounting method is illustrated in FIG. 8, in which the rotor shaft 60 has a worm 106 and is mounted in the brushholder component part 86 by means of a sliding bearing 116, in particular a spherical bearing.

Figure 8:
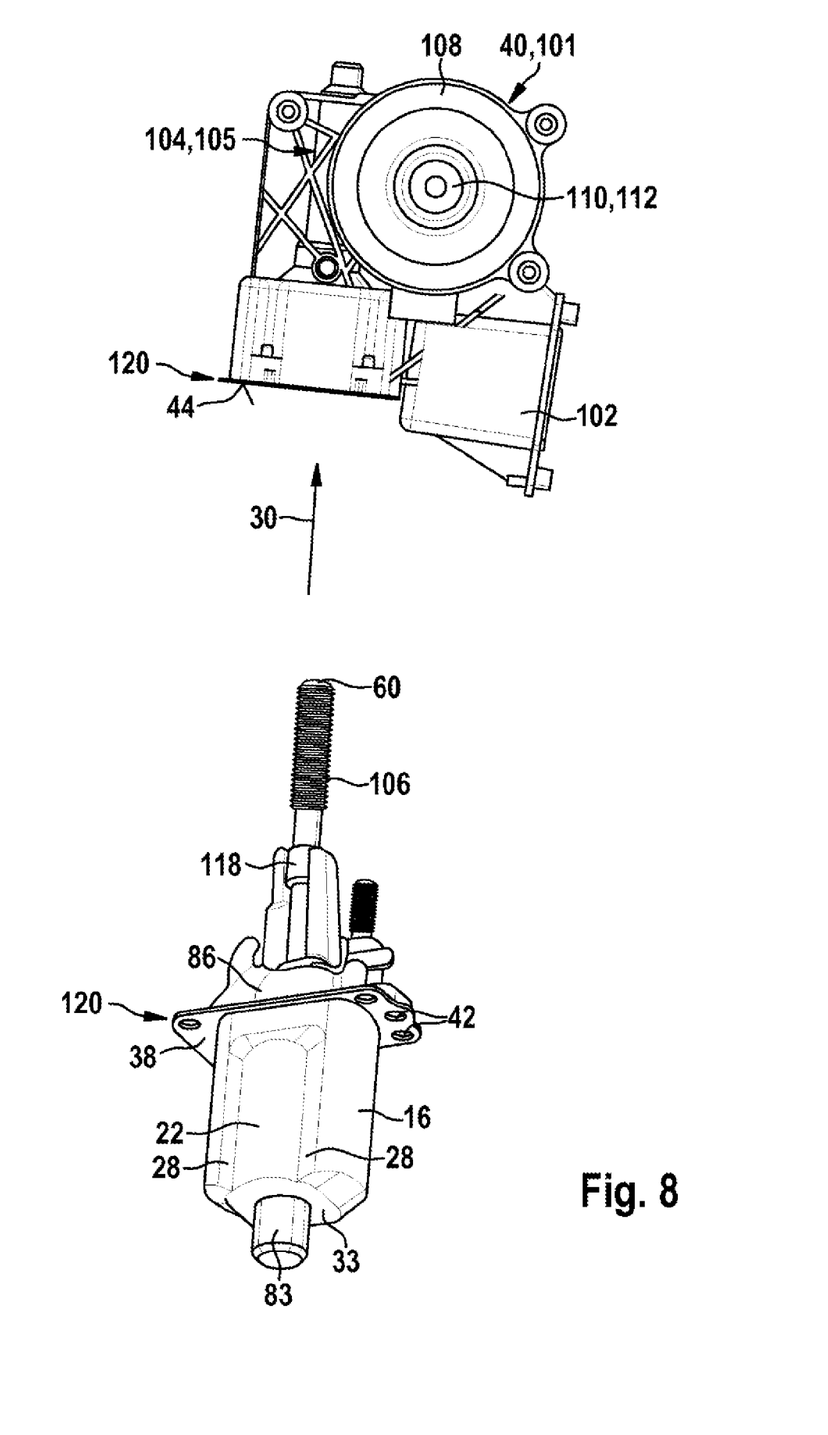
FIGS. 8 to 10 show the mounting concept in accordance with the invention and the modular system of the different gear/drive units.
Figure 9:
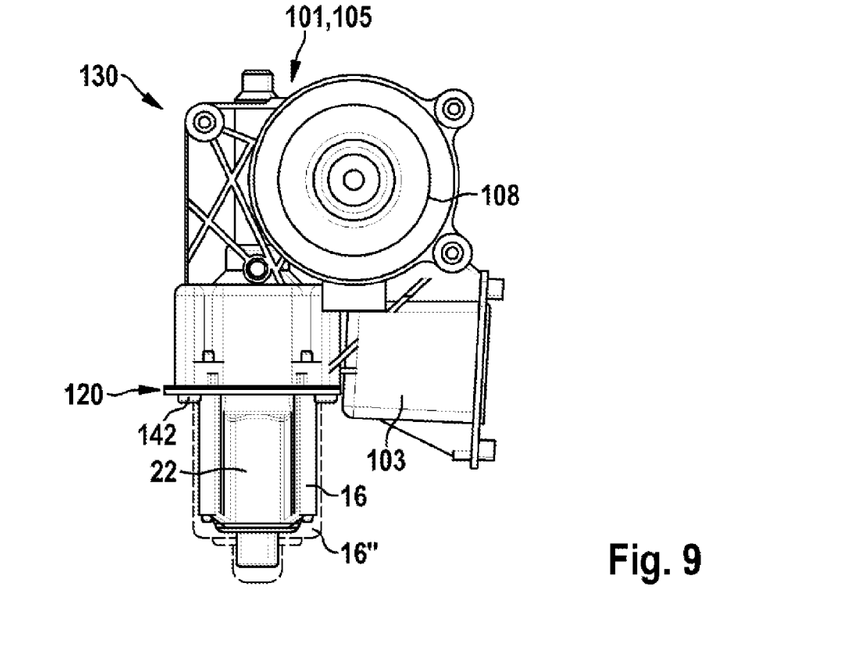

FIG. 8 shows a completely fitted gear/drive unit 130, which has an electric motor 11 with consequent poles 22 as electric machine 10, said electric motor being flanged in a housing part 40, which is in the form of a gearbox 101 in which a gear 104 is arranged. The gear 104 is in the form of a worm gear 105, for example, in which the worm 106 arranged on the rotor shaft 60 of the electric motor 11 meshes with a worm gear 108 mounted in the gearbox 101. The drive torque of the electric motor 11 is passed on from the worm gear 108 to an output drive element 110, in particular an output drive pinion 112, which drives the part to be adjusted, in particular in the motor vehicle, for example. The pole housing 16 of the electric motor 11 is produced from metal and acts as magnetic return path. The gearbox 101 is produced from plastic in the exemplary embodiment, in particular by means of an injection-molding process. The housing part 40 has an electronics housing 102 for receiving an electronics unit 103 and is formed as an integral part of the gearbox 101. The electronic unit 103 is in the form of withdrawable-part electronics in FIG. 9, in which a printed circuit board with a plug element is introduced into the open interface 114 of the integrated electronics housing 102. A plurality of electronic component parts can be arranged on the printed circuit board, for example a microprocessor which is used for actuating the electric motor 11 and/or for evaluating a rotary position signal of the rotor shaft 60. In this case, a rotary position sensor can be arranged on the printed circuit board and interacts with a signal transducer arranged on the rotor shaft 60. As a result, in particular position detection of the servo drive and/or a trap-prevention function for the gear/drive unit 130 can be realized.

Figure 10:
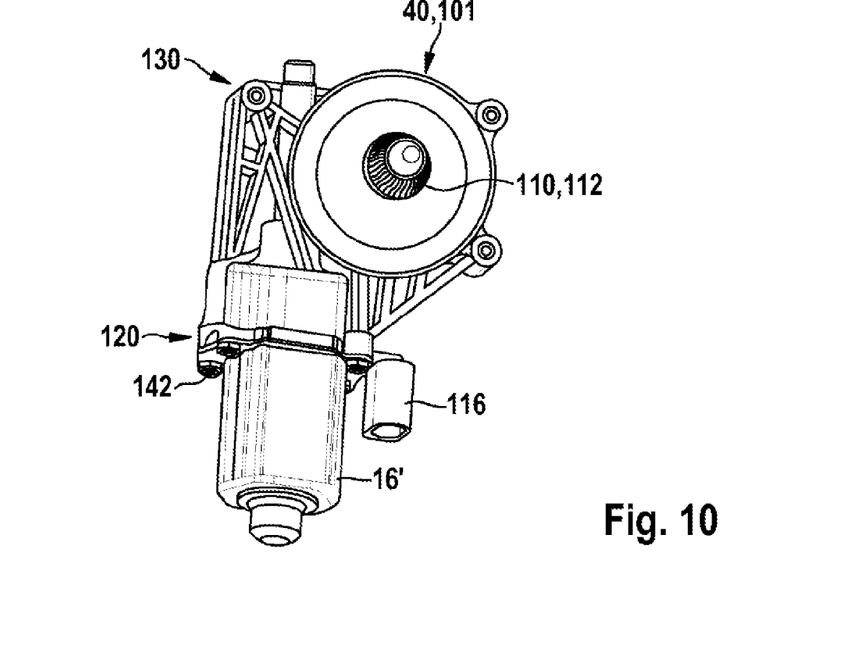

FIG. 10 illustrates a further gear/drive unit 130 of the modular system according to the invention, in which a gearbox 101 is formed without an electronics housing. In this case, the brushholder component part 86 has a plug tap-off unit 116, which protrudes radially at the defined interface 120 between the pole housing 16 and the gearbox 101. Such an embodiment does not have any electronics, but merely a motor power supply. The modular system with the defined interface 120 now makes it possible for the pole housing 16 with the two permanent magnets 18, in particular ferrite magnets, and the two consequent poles 22 to be combined with different gearboxes 101, which all have the identical opposing flange 44, but different electronics functions. Alternatively, a gearbox 101 which has integrated a torque inhibitor in the gear 104 can be used. Likewise, different pole housings 16, 16' can be flanged to a specific gearbox 101, for example in FIG. 9. A first pole pot 16 according to the invention with two consequent poles 22 can be flange-connected, or alternatively another electric motor 11, which has no consequent poles, for example as in FIG. 10, but only two permanent magnet poles, which are in particular in the form of ferrite magnets, can be flanged to the identical gearbox 101. This is illustrated by dashed lines by the second pole pot 16' in FIG. 9. In this case, the flange 38 and the opposing flange 44 always form the defined identical interface 120 with identical connecting elements 142, wherein the brushholder component part 86 can be matched correspondingly to the different electronics variants. In this case, the modified brushholder component part 86 always fits into the installation space which is formed by the connecting region 37 of the pole housing 16 and the inner contour of the corresponding opposing flange 44.

The observation will be made that many possible combinations of the individual features with one another are possible in respect of the exemplary embodiments shown in the figures and disclosed in the description. Thus, for example, the gear/drive unit 130 can also be formed with a type of gear which deviates from a worm gear 105. The structure, stability and shape of the housing part 40 and the arrangement and embodiment of the connecting elements 142 and the receptacles 42 thereof at the interface 120 can be varied corresponding to requirements. The electric machine 10 is preferably used for servo drives in a motor vehicle, for example for adjusting seat parts, window panes, sliding roofs and covers of openings, but is not restricted to such applications.

The invention claimed is:

1. An electric machine (10), comprising a stator (12), into which a rotor (14) can be inserted, wherein the stator (12) has two mutually opposite permanent magnets (18), which are arranged in a pole housing (16) forming a magnetic return path, and the pole housing (16) has mutually opposite flattened regions (20) between the two permanent magnets (18), with a pole housing wall (26) forming two mutually opposite magnetic consequent poles (22) on said regions, characterized in that a maximum dimension (25) of the pole housing (16) between the two mutually opposite flattened regions (20), axially in a region of the consequent poles (22), forms a width across flats (24) for an installation space of the electric machine (10), the width across flats being at most 35 mm, wherein each of the two mutually opposite flattened regions (20) of the pole housing (16) has two beads (28) which extend approximately parallel to one another in an axial direction (30) and which form an inner contour of the consequent poles (22) and a transition to holding regions (34) of the permanent magnets (18), and the pole housing (16) is closed at a first axial end (33), wherein a pole housing base (82) is formed so as to be in one piece with the pole housing (16), and a receptacle (83) for a bearing of the rotor (14) is arranged at the first end (33), wherein an opposite second axial end (36) is formed so as to be open and has a flange (38), which is connectable to a further housing part (40), wherein an axial transition region (45) is formed between the flange (38) and the beads (28), in which axial transition region a maximum dimension (25) between the mutually opposite flattened regions (20) increases along the axial direction (30), starting from the inner contour of the consequent pole region (22) towards an inner width (137) of a connecting region (37) with two inner faces (35) which are opposite one another approximately parallel to one another.

2. The electric machine (10) as claimed in claim 1, characterized in that a wall thickness (54) of the pole housing (16) is 2% to 7% of the width across flats (24).

3. The electric machine (10) as claimed in claim 1, characterized in that a radial wall thickness (56) of the permanent magnets (18) is 10% to 25% of the width across flats (24).

4. The electric machine (10) as claimed in claim 1, characterized in that the rotor (14) has rotor teeth (66) for receiving electrical windings (64), which rotor teeth are in the form of radial tooth shafts (68) with tooth tips (70) arranged radially on an outside, wherein a tooth shaft width (72) in a circumferential direction (32) is 3% to 10% of the width across flats (24).

5. A modular system for forming different gear/drive units (130), wherein different pole housings (16) have an identical flange (38) and an identical connecting region (37), which are compatible with identically designed opposing flanges (44) of different gear housings (101), wherein a first pole housing (16) is designed in accordance with an electric machine (10) as claimed in claim 1 and a second pole housing (16') has, instead of the two consequent poles (22), only one magnetic return path between two oppositely magnetized permanent magnets (18) of a two-pole motor and/or a third pole housing (16") has, instead of the two consequent poles (22), two further permanent magnets of a 4-pole motor.

6. The electric machine as claimed in claim 1 wherein the width across flats is at most 30 mm.

7. The electric machine (10) as claimed in claim 1, characterized in that a wall thickness (54) of the pole housing (16) is 3% to 4% of the width across flats (24).

8. The electric machine (10) as claimed in claim 1, characterized in that a radial wall thickness (56) of the permanent magnets (18) is 15% to 18% of the width across flats (24), and the permanent magnets (18) are in the form of ferrite magnets.

9. The electric machine (10) as claimed in claim 1, characterized in that the rotor (14) has ten rotor teeth (66) for receiving electrical windings (64), which rotor teeth are in the form of radial tooth shafts (68) with tooth tips (70) arranged radially on an outside, wherein a tooth shaft width (72) in a circumferential direction (32) is 5% to 7% of the width across flats (24).

10. A method for producing an electric machine (10) as claimed in claim 1, the electric machine being a servo drive in a motor vehicle, comprising the following method steps:
    forming the pole housing (16) from metal by deep-drawing, wherein beads (28) for forming the consequent poles (22) are formed, and axial protrusions (98) towards a flange (38) are formed integrally on an interior of a pole housing base (82),
    inserting the permanent magnets (18) into the pole housing (16) using adhesive, wherein the permanent magnets (18) are oppositely magnetized with respect to a radial direction (31), and
    fixing the permanent magnets in the pole housing with magnetic holding springs (90) in such a way that free ends (95) of limbs (91) of the holding springs bear against end sides (93) of the permanent magnets (18) in a circumferential direction (32), and a bow (92) of the holding springs bears radially against axial projections (98) of the pole housing radially outside said axial projections.

11. The electric machine (10) as claimed in claim 1, characterized in that each permanent magnet (18) forms approximately a segment of a circular ring, a central region (81) of said segment having a first inner radius (74) which is smaller than a second inner radius (76) at two outer, with respect to a circumferential direction (32), regions (79) of the permanent magnet (18).

12. The electric machine (10) as claimed in claim 11, characterized in that the central region (81) of the permanent magnet (18) with the first inner diameter (74) comprises an angular range (78) of 50° to 60°, which is adjoined on both sides by the outer regions (79) with the second inner radius (76).

13. The electric machine (10) as claimed in claim 1, characterized in that each permanent magnet (18) forms approximately a segment of a circular ring, a central region (81) of said segment having a first inner radius (74) which is smaller than a second inner radius (76) at two outer, with respect to a circumferential direction (32), regions (79) of the permanent magnet (18), wherein the first inner radius (74) is at most 15% larger than the outer radius (52) of the rotor (14).

14. The electric machine (10) as claimed in claim 13, characterized in that the central region (81) of the permanent magnet (18) with the first inner diameter (74) comprises an angular range (78) of 50° to 60°, which is adjoined on both sides by the outer regions (79) with the second inner radius (76), wherein the total extent (80) of the permanent magnet (18) in the circumferential direction (32) is approximately 90°.

15. The electric machine (10) as claimed in claim 1, wherein the first axial end (33) is the pole housing base (82)

in one piece with the pole housing (16), and wherein the flange (38) is connectable to a gearbox (101).

16. The electric machine (10) as claimed in claim 15, characterized in that a brushholder component part (86) is received in the connecting region (37), said brushholder component part extending axially from an interior of the pole housing (16) beyond the flange (38) into the gearbox connected to said flange, wherein the flange (38) has, in an angular range of the consequent poles (22), two circumferential sides (39) which are opposite one another and parallel to one another and, in an angular range (78, 80) of the permanent magnets (18), opposite, a plurality of receptacles (42) for connecting elements (142) for fixing the axially connecting the gearbox.

17. The electric machine (10) as claimed in claim 15, characterized in that the permanent magnets (18) are fixed in the pole housing (16) by means of magnetic holding springs (90), two limbs (91) of said magnetic holding springs each pressing the opposite permanent magnets (18) against an inner wall (17) of the pole housing (16), wherein a cavity (94) is formed between end sides (93) of the permanent magnets (18) in a circumferential direction (32) and the beads (28), into which cavity the limbs (91) engage.

18. The electric machine (10) as claimed in claim 17, characterized in that axially free ends (95) of the limbs (91) each bear against the end sides (93) in a radially inner half of the end sides (93), and bear against inner edges (97) of the beads (28) in a transition section (87) to a bow (92), wherein the axially free ends (95) of the limbs (91) at the same time bear against a side face (27) of the beads (28) which is opposite the end sides (93) in the circumferential direction (32).

19. The electric machine (10) as claimed in claim 18, characterized in that stops (98) are formed on the closed end (33) of the pole housing (16) on an inner side thereof, which stops are manufactured in one part with the pole housing (16), with the bow (92) arranged between the two limbs (91) bearing radially against said stops in order to avoid tipping of the bow (92) radially inwards, wherein the bow (92) bears axially against the pole housing base (82).

20. The electric machine (10) as claimed in claim 1, wherein the further housing part (40) is a gearbox (101).

21. The electric machine (10) as claimed in claim 20, characterized in wherein the axial transition region (45) is conical and extends 4 mm to 13 mm.

22. The electric machine (10) as claimed in claim 21, characterized in that a brushholder component part (86) is received in the connecting region (37), said brushholder component part extending axially from an interior of the pole housing (16) beyond the flange (38) into the housing part (40) connected to said flange.

23. The electric machine (10) as claimed in claim 20, characterized in that the permanent magnets (18) are fixed in the pole housing (16) by means of magnetic holding springs (90), two limbs (91) of said magnetic holding springs each pressing the opposite permanent magnets (18) against an inner wall (17) of the pole housing (16), wherein a cavity (94) is formed between end sides (93) of the permanent magnets (18) in a circumferential direction (32) and the beads (28), into which cavity the limbs (91) engage.

24. The electric machine (10) as claimed in claim 23, characterized in that axially free ends (95) of the limbs (91) each bear against the end sides (93) in a radially inner region (96) of the end sides (93) and bear against inner edges (97) of the beads (28) in a transition section (87) to a bow (92).

25. The electric machine (10) as claimed in claim 24, characterized in that stops (98) are formed on the closed end (33) of the pole housing (16) on an inner side thereof, with the bow (92) arranged between the two limbs (91) bearing radially against said stops in order to avoid tipping of the bow (92) radially inwards.

* * * * *